United States Patent
Yoo

(10) Patent No.: US 9,141,147 B2
(45) Date of Patent: Sep. 22, 2015

(54) E-BOOK

(75) Inventor: Jeongsun Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 780 days.

(21) Appl. No.: 13/502,008

(22) PCT Filed: Oct. 13, 2010

(86) PCT No.: PCT/KR2010/006994
§ 371 (c)(1),
(2), (4) Date: Jul. 26, 2012

(87) PCT Pub. No.: WO2011/046361
PCT Pub. Date: Apr. 21, 2011

(65) Prior Publication Data
US 2012/0281866 A1    Nov. 8, 2012

(30) Foreign Application Priority Data
Oct. 16, 2009    (KR) .................. 10-2009-0098711

(51) Int. Cl.
*H04R 1/02*    (2006.01)
*G06F 1/16*    (2006.01)

(52) U.S. Cl.
CPC ............ *G06F 1/1688* (2013.01); *G06F 1/1626* (2013.01)

(58) Field of Classification Search
CPC ........ H04R 5/02; G06F 1/1688; G06F 1/1626
USPC ......................................................... 381/333
See application file for complete search history.

(56) References Cited

U.S. PATENT DOCUMENTS

| 2003/0198040 | A1  | 10/2003 | Chen et al. |
| 2004/0207978 | A1* | 10/2004 | Ueda et al. .................... 361/683 |
| 2006/0103624 | A1  | 5/2006  | Ishito et al. |
| 2007/0071259 | A1* | 3/2007  | Tojo .............................. 381/152 |
| 2008/0130208 | A1  | 6/2008  | Watanabe et al. |
| 2009/0190788 | A1  | 7/2009  | Yang et al. |
| 2009/0274336 | A1* | 11/2009 | Infanti .......................... 381/386 |
| 2010/0324709 | A1* | 12/2010 | Starmen ......................... 700/94 |

FOREIGN PATENT DOCUMENTS

| CN | 2643587 Y   | 9/2004 |
| CN | 1979410 A   | 6/2007 |
| CN | 101273660 A | 9/2008 |

* cited by examiner

*Primary Examiner* — Sonia Gay
(74) *Attorney, Agent, or Firm* — Birch, Stewart, Kolasch & Birch, LLP

(57) ABSTRACT

Disclosed herein is an e-book, the e-book including a first cover provided with a display panel outputting a screen, a second cover mounted on the first cover to furnish a receiving space between the first cover and the second cover, a support frame supporting the display panel and making a circuit substrate safely placed thereon, and a speaker electrically connected to the circuit substrate, wherein a sound groove is formed in the support frame, indented towards the first cover side to safely place the speaker, and a distance from the support frame surface to the sound groove bottom surface is formed to be equal to or larger than a distance from the sound groove bottom surface to the speaker surface, capable of enhancing an output effect of sound and minimizing a space occupied by a soundbox of a speaker and thus realizing overall slimness.

8 Claims, 1 Drawing Sheet

E-BOOK

TECHNICAL FIELD

The present invention relates to an e-book capable of perusing an electronic document.

BACKGROUND ART

Limelights have been taken into an e-book since it is lightweight and thin compared to an existing heavy and easy-to-carry paper book and if only storage capacity fully provided, almost library-level material may be carried on and read.

A recent e-book is not limited to a simple character-reading function, and can output pictures and images at the same time as a sound and voice outgoing in order to give audio-visual complacency to users.

The e-book outputs voice and sound through a speaker mounted on a main body case, and in order to enhance the output effect of the speaker, provides a separate soundbox for use in a state of the soundbox being mounted on a speaker.

In a general structure of the e-book, a display panel outputting photographs, figures, pictures, etc. is mounted on a main body case embedded with a circuit substrate provided with various kinds of components, and a keypad assembly inputting a user command is disposed at one side of the display panel.

The speaker is unavoidably mounted on one side or both sides of a keypad assembly as a general e-book arrangement structure, and if the keypad assembly occupying area is reduced for the mounting of the speaker, causing inconveniencies of an operation, the entire size of the e-book becomes larger in the end.

At this time, because the soundbox is manufactured in a die to be mounted separately of the main body case, a width of each side of the keypad assembly becomes as much wider as a space where the soundbox is occupied.

To improve such problems, in a case the soundbox is mounted at both sides of the keypad assembly by substantially decreasing the area of the keypad assembly while keeping the size of the display panel and the main body case as it is, an end part shape of a circuit substrate mounted on the main body case is complicated.

Further, in a case the speaker is mounted around the back surface of the circuit substrate and finished by the main body case while omitting the soundbox occupying space, an output efficiency of sound and voice deteriorates.

DISCLOSURE OF INVENTION

Technical Problem

Devised in order to improve such problems, an object of the present invention is to provide an e-book having a structural strength without any difficulty in slimness realization by properly disposing a soundbox of a speaker as well as enhancing an output effect of sound and voice.

The technical challenge to be achieved by the present invention is not limited to the aforementioned technical challenge, and those skilled in the art would clearly understand other un-mentioned technical challenges from the following recitation.

Solution to Problem

An e-book according to one embodiment of the present invention includes a first cover provided with a display panel outputting a screen, a second cover mounted on the first cover to provide a receiving space between the first cover and the second cover, a support frame supporting the display panel and making a circuit substrate safely placed thereon, and a speaker electrically connected to the circuit substrate, wherein a sound groove is formed in the support frame, indented towards the first cover side to safely place the speaker, and a distance from the support frame surface to the sound groove bottom surface is equal to or greater than a distance from the sound groove bottom surface to the speaker surface.

The support frame further includes a guide guiding in a direction that a cable of the speaker is fixed to the circuit substrate.

The support frame includes a main plate safely placing the circuit substrate and battery, and a partition wall projecting along the edges of the main plate to isolate the main plate from the first cover.

The sound groove is constructed at opposite sides of the support frame at a certain interval to form one pair, and the guide is formed between a pair of sound grooves to face each other, and a hole is formed between the guide to be connected to the circuit substrate.

The guide includes a guide groove formed from one side of the sound groove to a hole to guide a cable, and a leave projectingly formed at one side of the guide groove to press down the cable.

The circuit substrate is provided with a connector coupling to an end part of the cable.

In the second cover, a grill emitting sound at a position corresponding to the sound groove towards outside is formed.

The guide groove further includes an assisting groove formed at a certain gap from an end part of the leave for connection to the hole.

An e-book according to another embodiment of the invention includes a display panel outputting a screen, a support frame supporting the display panel on its front surface, and having a circuit substrate safely placed, and a speaker electrically connected to the circuit substrate, wherein a sound groove safely placing the speaker is formed on the rear surface of the support frame.

Advantageous Effects of Invention

An e-book of the present invention can adopt a structure that a sound groove is integrally formed onto a support frame supporting a display panel and a circuit panel, and a speaker is mounted on the sound groove, thereby enhancing an output effect of voice and sound and minimizing a space occupied by a soundbox of a speaker and thus realizing overall slimness without any difficulty.

And, an e-book of the invention can properly distribute an external force acting on a space by a soundbox formed depth by virtue of a soundbox arrangement structure integrally formed in the support frame, thereby enhancing a structural strength.

BEST MODE FOR CARRYING OUT THE INVENTION

Figure 1:
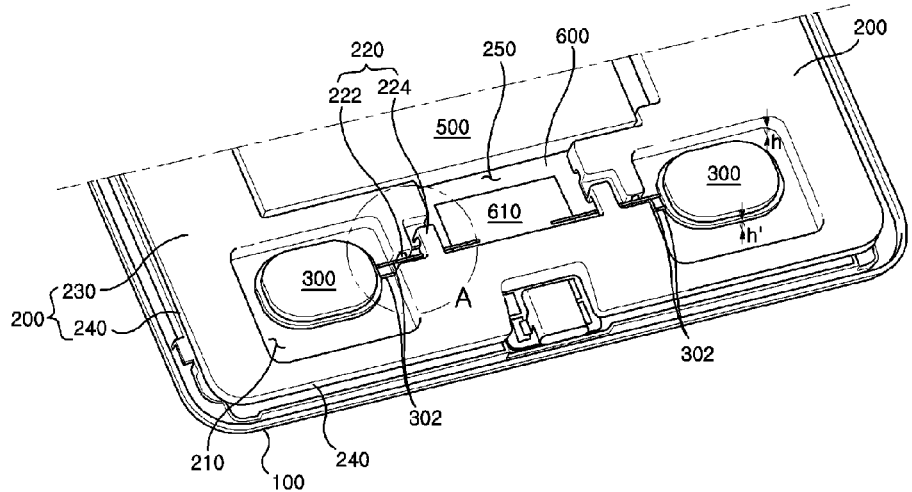
FIG. 1 is a partial perspective view indicating the remaining construction of an e-book divided from a second cover of the e-book.

Hereinafter, a preferred embodiment of the invention will be described in consideration of the annexed drawings.

The size and shape of components shown in the drawings during this procedure may be exaggerated or simplified for the sake of description's clarity and conveniences. Also, specially defined terms in consideration of the construction and function of the present invention may be varied according to the intention and custom of users and operators. Such terms-related definition should be made based on recitations throughout the entire specification.

Figure 2:
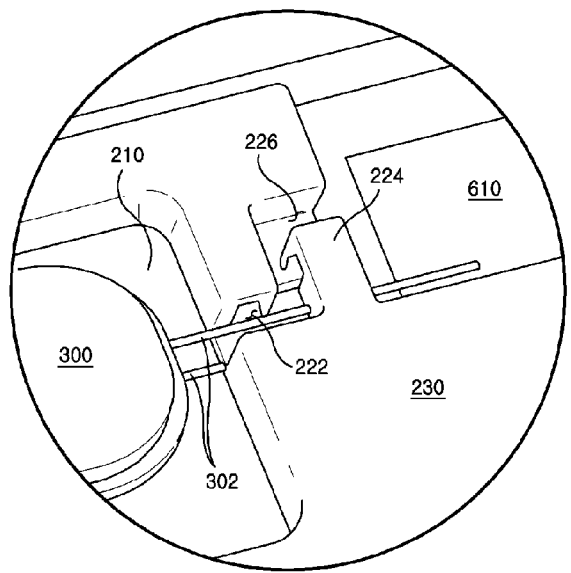
FIG. 2 is an enlarged partial perspective view of FIG. 1.
Figure 3:
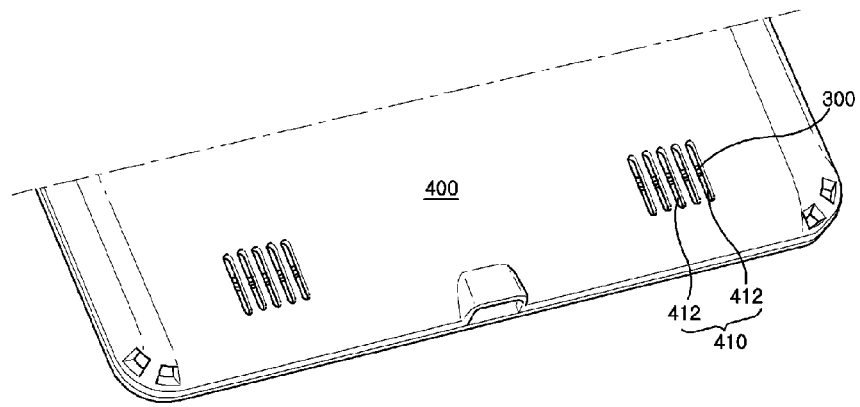
FIG. 3 is a partial view indicating a second cover mounted state of an e-book according to one embodiment of the invention.

FIG. 1 is a partial perspective view indicating the remaining construction of an e-book divided from a second cover of the e-book, FIG. 2 is an enlarged partial perspective view of FIG. 1, and FIG. 3 is a partial view indicating a state finished with a second cover of an e-book according to one embodiment of the invention.

The present invention includes a first cover 100, a support frame 200, a speaker 300, and a second cover 400.

A first cover 100 supports edges of a display panel (hereinafter, not shown) outputting a screen, and each kind of circuit component such as a support frame 200 and the display panel is built therein.

The display panel may be variously selected from a manufacture environment or a manufacturing condition such as an OLED panel and a flexible electronic film panel as well as an LCD panel.

On a support frame 200, a circuit substrate 600 electrically connected to the display panel is safely placed and it is coupled to edges of a first cover 100.

A support frame 200 has the display panel and a circuit substrate 600 safely placed to be coupled to a first cover 100, but it acts as an endoskeleton by having a second cover 200 separated around a certain distance from the display panel and a circuit substrate 600 in order to effectively distribute and support an external force and a shock imposed on the display panel and a circuit substrate 600.

A speaker 300 is safely placed on a support frame 200 to be electrically connected to a circuit substrate 600, and embodies an audio effect together with the display panel realizing a visual effect.

A second cover 400 is entirely connected to a first cover 100, and a receiving space is provided between a first cover and a second cover, and this receiving space is used to receive the display panel, a circuit panel 600, a support frame 200, etc.

Herein, a support frame 200 is therein formed of a soundbox 210 indented towards a first cover 100 side for the safely placement of a speaker 300, and a distance (h) from the surface of a support frame 200 to a bottom surface of a soundbox 210 is longer than or equal to a distance (h') from a bottom surface of a soundbox 210 to the surface of a speaker 300 for a smooth finish coupling of a second cover 400.

That is, if a speaker 300 is safely placed in a soundbox 210, it can prohibit a speaker 300 protruding from the surface of a support frame 200 to prevent an interference occurrence between a second cover 400 and a speaker 300 when a second cover 400 is coupled.

MODE FOR THE INVENTION

The present invention is applicable and implementable by the above-mentioned configuration, and an explanation for a major component for the interpretation of various embodiments follows.

A support frame 200 safely placing and supporting components such as the display panel and a circuit substrate 600 built in a first cover 100 and a second cover 400 to distribute a shock and an external force throughout the entire surface, includes a main plate 230 and a partition wall 240.

A main plate 230 is made in a flat-plate shape corresponding to edges of a first cover 100, and is therein formed an aperture safely placing a battery 500 to be electrically connected to a circuit substrate by the safely placement of the battery 500, and it provides an area safely placing a circuit substrate 600 and the display panel.

A partition wall 240 projects along edges of a main plate 230 to separate a main plate 230 from a first cover 100, and a projecting height of a partition wall 240 may be properly formed considering the thickness of components such as the display panel and a circuit substrate 600 safely placed on a main plate 230.

In the meantime, in a support frame 200, a guide 220 is formed guiding to fix a cable 302 of a speaker 300 to a circuit substrate 600 at one side of a soundbox 210. A guide 220 guides a cable 302 for the purpose of protecting a minute component weak to an external shock and an external force such as a connecting line 302 from being exposed and easily performing an electric connection with a circuit substrate 600.

Herein, a sound groove 210 is disposed in one pair at a certain interval at opposite sides of a main plate 230 for the output of realistic voice and sound. And, a guide 220 is formed between a pair of sound grooves 210, and a hole 250 connecting to a circuit substrate 600 is formed among a guide 220 arranged to face each other.

At this time, a guide 220 includes a guide groove 222 formed in a cut shape from one side of sound groove 210 to a hole 250 to pass through a cable 302, and a leave 224 formed in perpendicular to the guide groove 222 to press down a cable 302.

A cable 302 of a speaker 300 connects to a hole 250 side through between a guide groove 222 and a leave 224.

And, on a circuit substrate 600, a connector 610 is mounted connecting to an end part of a cable 302.

Also, a guide groove 222 further includes an assisting groove 226 formed proximate to an end part of a leave 224 as shown in FIG. 2 to be connected to a hole 250.

An assisting groove 226 acts as a passage guiding based on a position where components such as a mounted connector 610 is disposed when a bypass connection is needed.

A second cover 400 finishes an exposure part of a support frame 200 as described above, and in a second cover 400, a grill 410 is formed including at least one or more of slits 412 penetrated at a position corresponding to a sound groove 210.

A grill 410 is provided for a user to easily hear voice or sound outputted through a speaker 300, and modifications and applications such as mounting a multiple of punctured holes or a mesh besides a formation like a slit 412 as shown in the figure are possible.

While embodiments according to the invention have been described at the foregoing part, they are merely exemplary provided, and it would be apparent to those skilled in the art that embodiments around various modifications and equivalents can be made therein.

Thus, the genuine protection scope of the invention technology should be defined by the following claims.

INDUSTRIAL APPLICABILITY

As described above, it can be known that the present invention considers its basic technical spirit to provide an e-book capable of enhancing an output effect of voice and sound and minimizing a space occupied by a soundbox of a speaker and realizing overall slimness without any difficulty as well as having a structural strength.

The invention claimed is:

1. An e-book, comprising:
   a first cover provided with a display panel outputting a screen;
   a second cover mounted on the first cover to provide a receiving space between the first cover and the second cover;
   a support frame supporting the display panel and making a circuit substrate safely placed thereon; and
   a speaker electrically connected to the circuit substrate,
   wherein a sound groove is formed in the support frame, indented towards the first cover side to safely place the speaker, and
   a distance from the support frame surface to the sound groove bottom surface is equal to or greater than a distance from the sound groove bottom surface to the speaker surface.

2. The e-book as claimed in claim 1, wherein the support frame further includes a guide guiding in a direction that a cable of the speaker is fixed to the circuit substrate.

3. The e-book as claimed in claim 1, wherein the support frame includes,
   a main plate safely placing the circuit substrate and a battery, and
   a partition wall projecting along the edges of the main plate to isolate the main plate from the first cover.

4. The e-book as claimed in claim 2,
   wherein the sound groove is constructed at opposite sides of the support frame at a certain interval to form one pair, and the guide is formed between a pair of sound grooves to face each other, and a hole is formed between the guide to be connected to the circuit substrate.

5. The e-book as claimed in claim 4, wherein the circuit substrate is provided with a connector coupled to an end part of the cable.

6. The e-book as claimed in claim 4, wherein a guide includes,
   a guide groove formed from one side of the sound groove to a hole to guide a cable, and
   a leave projectingly formed at one side of the guide groove to press down the cable.

7. The e-book as claimed in claim 1, wherein the circuit substrate is provided with a connector coupling to an end part of the cable.

8. The e-book as claimed in claim 5, wherein the guide groove further includes an assisting groove formed at a certain gap from an end part of the leave for connection to the hole.

* * * * *